April 28, 1953　　　C. E. ALEXANDER　　　2,636,619
VEHICLE HOIST

Filed Feb. 7, 1950　　　　　　　　　　3 Sheets-Sheet 1

Charles E. Alexander
INVENTOR.

BY Clarence A. O'Brien
and Harvey B. Jacobson
Attorneys

April 28, 1953     C. E. ALEXANDER     2,636,619
VEHICLE HOIST
Filed Feb. 7, 1950     3 Sheets-Sheet 2
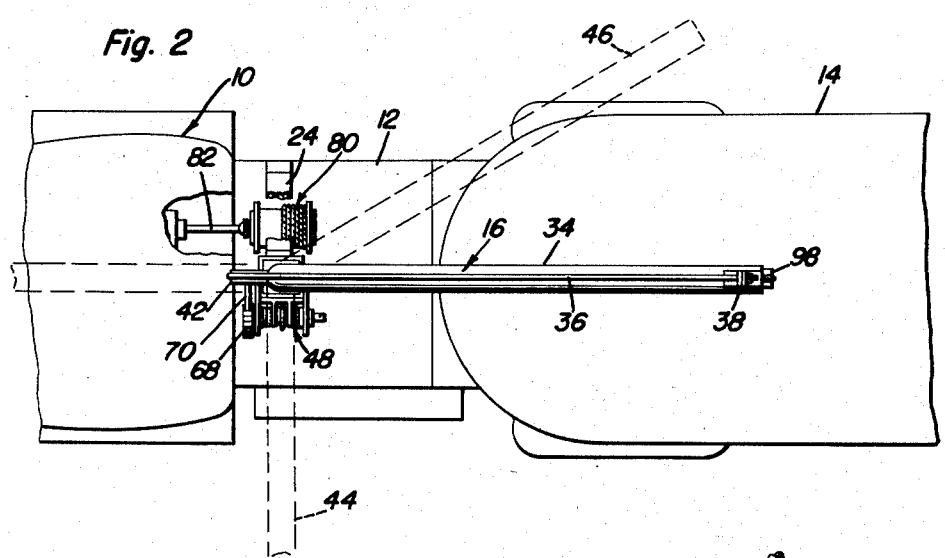
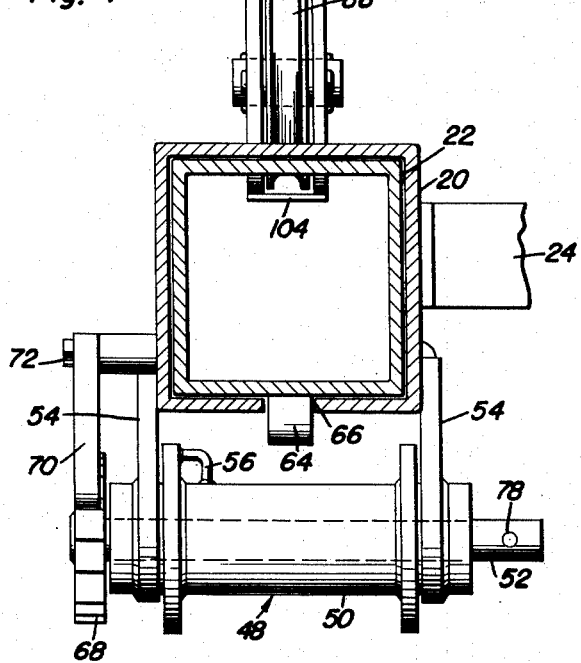
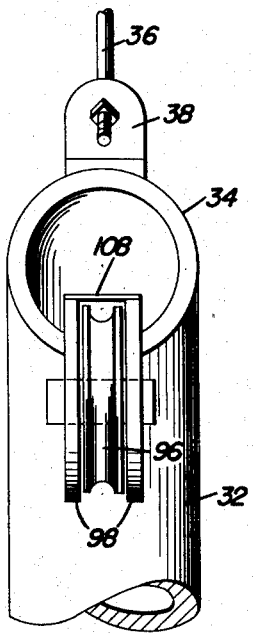
Charles E. Alexander
INVENTOR.

April 28, 1953        C. E. ALEXANDER        2,636,619
VEHICLE HOIST
Filed Feb. 7, 1950        3 Sheets-Sheet 3
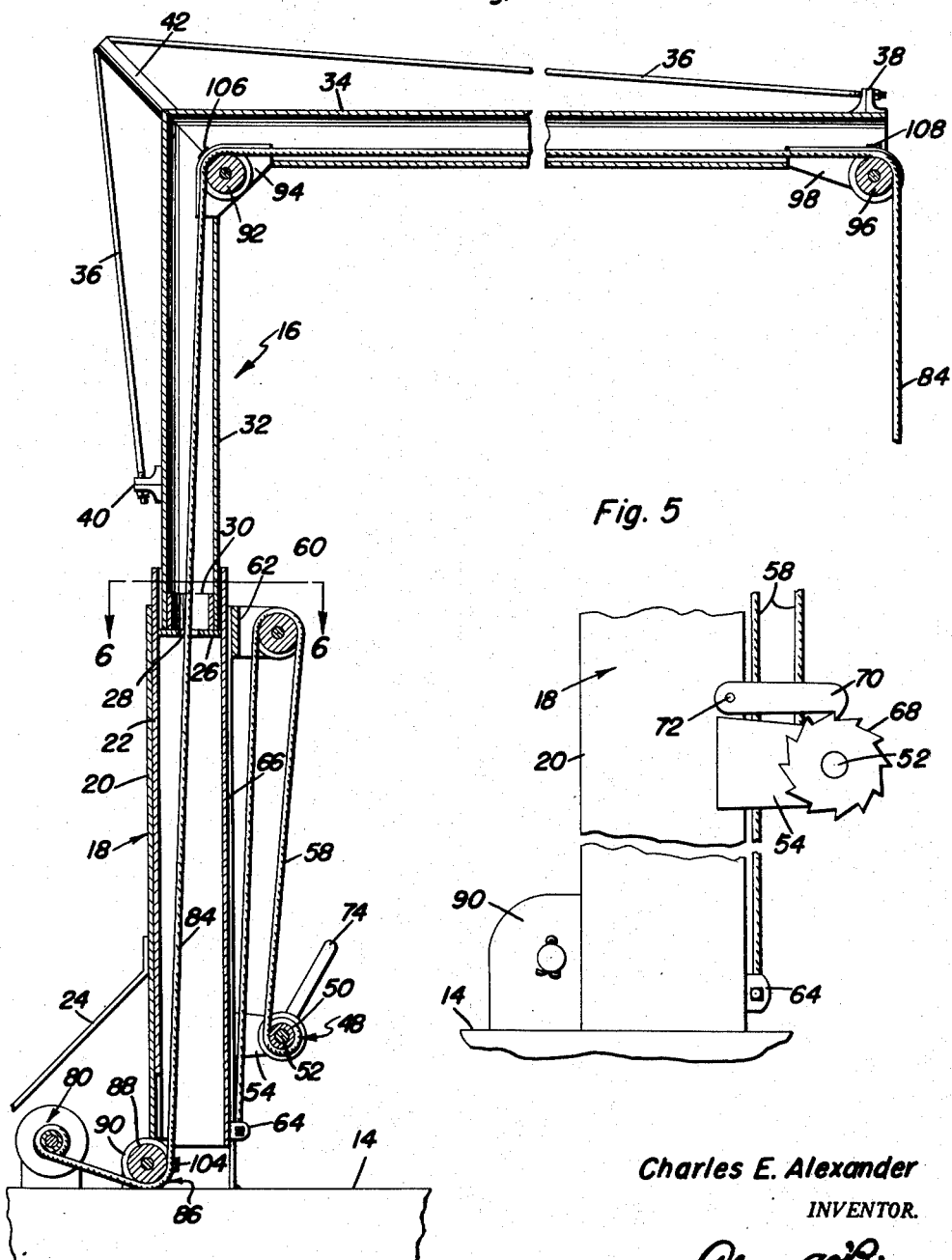
Charles E. Alexander
INVENTOR.

Patented Apr. 28, 1953

2,636,619

UNITED STATES PATENT OFFICE 2,636,619

VEHICLE HOIST

Charles E. Alexander, Raleigh, N. C.

Application February 7, 1950, Serial No. 142,917

1 Claim. (Cl. 212—64)

This invention relates to new and useful improvements and structural refinements in vehicle hoists, and the principal object of the invention is to facilitate convenient and expeditious loading and unloading of material on and from a truck, a trailer, or a similar vehicle.

This object is achieved by the provision of the instant hoist which is intended to be mounted upon a vehicle chassis, an important feature of the invention residing in the provision of means for raising and lowering the boom of the hoist so that when lowered, the boom does not project to any great extent above the vehicle body and, therefore, does not interfere with the passage of the vehicle under low overhead clearances.

Some of the advantages of the invention reside in its simplicity of construction, in its convenient and expeditious operation as aforesaid, and in its adaptability to installation on vehicles of different sizes and types.

Figure 1:
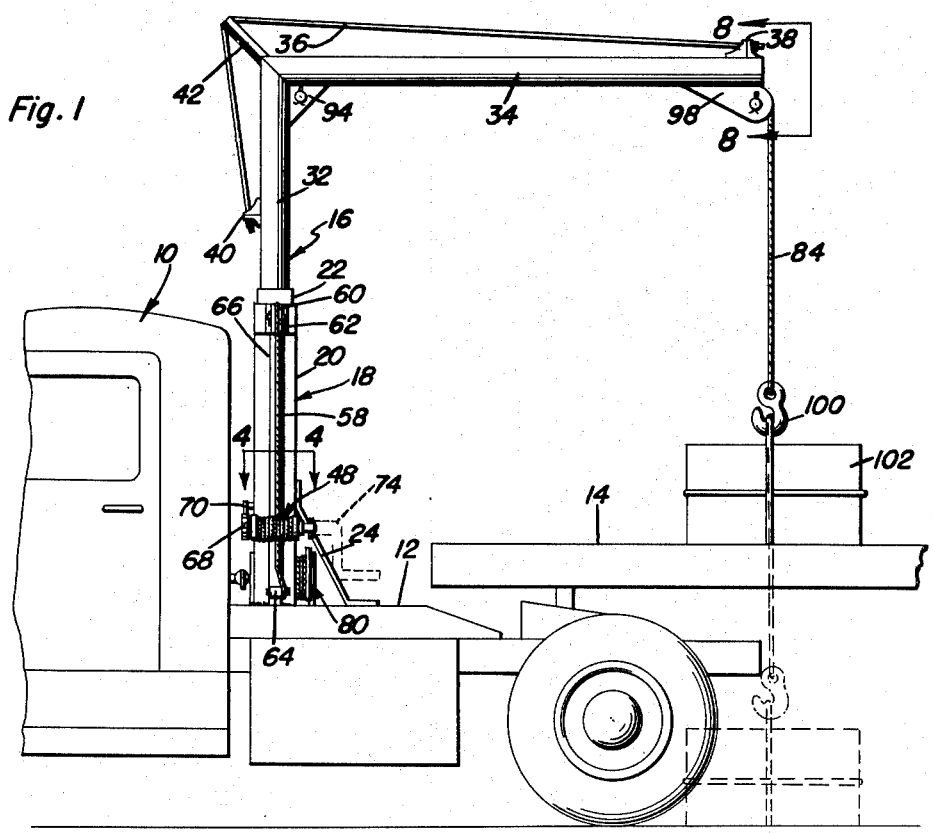
Figure 6:
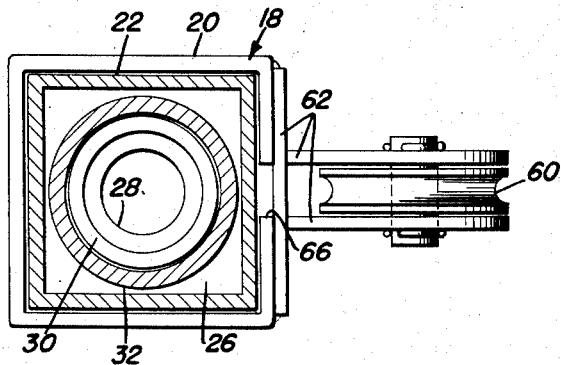
Figure 7:
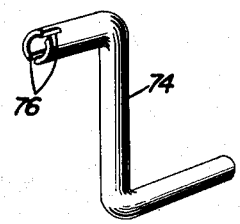

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a vehicle, showing the invention in situ thereon, Figure 2 is a fragmentary top plan view of the subject shown in Figure 1, Figure 3 is a vertical sectional view of the invention, Figure 4 is a fragmentary sectional view, taken substantially in the plane of 4—4 in Figure 1, Figure 5 is a fragmentary side elevational view showing the lower end portion of the hoist standard, Figure 6 is a fragmentary sectional view, taken substantially in the plane of the line 6—6 in Figure 3, Figure 7 is a perspective view of a winch crank used in the invention, and Figure 8 is a fragmentary end view, taken substantially in the plane of the line 8—8 in Figure 1.

Like characters of reference are employed to designate like parts in the specification and throughout the several views.

Referring now to the accompanying drawings in detail, the general reference character 10 designates a vehicle, such as for example, a tractor including a chassis 12 to which is connected a semi-trailer 14, the invention residing in the provision of a hoist designated generally by the reference character 16.

This hoist embodies in its construction a vertically extensible standard 18 consisting of a lower or outer section 20 and an upper or inner section 22 which is slidably telescoped in the lower section 20 so that the height of the standard may be increased or decreased, as desired.

The lower end of the lower section 20 is secured by welding, or the like, to the vehicle chassis 12, and it is to be noted that the two standard sections 20, 22 are hollow and preferably polygonal in cross sections (see Figure 4) whereby relative rotation thereof is prevented.

Diagonal struts 24 may extend from the lower section 20 to the chassis 12 for the purpose of reinforcing the entire standard, and it is to be noted that a substantially horizontal bearing plate 26 is secured in the upper section 22 adjacent to the upper end of the latter, and is provided with a central aperture or opening 28, the purpose of which will be hereinafter more fully described.

A tubular collar 30, in turn, is rigidly secured to the upper surface of the plate 26 and the lower end portion of a tubular, upright mast 32 rotatably engages this collar or sleeve and rests upon the upper surface of the plate 26 while being encased by the upper end portion of the upper section 22 of the standard, as is illustrated in Figure 3.

A laterally projecting, tubular boom 34 constitutes a continuation of the upper end of the mast 32 and a bracing element or rod 36, anchored to a bracket 38 at the free end of the boom and to a similar bracket 40 on the mast 32, passes over an oblique strut or brace 42 which is provided at the junction of the boom with the mast, thus reinforcing the boom to the mast and preventing any possible sagging.

It will be apparent from the foregoing that by virtue of the rotatability of the mast 32 with respect to the upper section 22 of the standard 18, the boom 34 may be swung from one side of the vehicle chassis to the other as is indicated by the phantom lines 44, 46 in Figure 2. Moreover, by virtue of the extensibility of the standard 18, the boom 34 may be lowered and raised so that, in its lowered position, it does not project to any great extent above the body of the vehicle 10, and the vehicle is thus able to travel under restricted overhead clearances notwithstanding the presence of the hoist. Raising and lowering of the mast and the associated boom is effected by means of a manually operated winch 48 including a drum 50 mounted upon a shaft 52 which, in turn, is journaled in a pair of brackets 54 secured to the lower end portion of the standard section 20, the winch drum 50 being provided with an angulated detent 56 to which may be anchored the inner end of a flexible element such as a cable 58 for winding on the winch drum.

The cable 58 passes over a guide pulley 60 which is rotatably mounted in a bracket unit 62 provided adjacent to the upper end of the standard section 20 and the free end of the cable is suitably anchored to a lug 64. This lug, which is affixed to the lower end portion of the inner or upper section 22 of the standard 18 is slidable vertically in a slot 66 provided in the outer or lower standard section 20, it being apparent that by simply rotating the winch drum 50, the standard section 22 as well as the associated mast 32 and boom 34 may be lowered or raised as desired. However, the winch unit 48 may be locked against undesired lowering movements by means of a ratchet 68 secured to the shaft 52 and engaged by a pawl 70 pivoted to the standard as at 72, as is best illustrated in Figure 5. A removable hand crank 74 is used for rotating the winch unit 48, this hand crank being provided with opposing slots 76 for engagement with a transverse, projecting pin 78 with which the shaft 52 is equipped, substantially as shown.

Raising and lowering of the load is effected by means of a second winch unit 80 which is mounted on the chassis 12 and is operatively connected to a power take-off shaft 82 of the vehicle, the winch unit 80 having a hoisting cable 84 which passes through an opening 86 into the standard 18. The opening 86 is provided in the lower end portion of the lower standard section 20 and a guide pulley 88 is rotatably mounted in a bracket unit 90 in the opening 86, so that the cable 84 may engage the guide pulley 88 and extend upwardly in the standard through the aforementioned aperture 28 into the mast 32, as is best illustrated in Figure 3.

The cable 84 then passes over a second guide pulley 92 rotatably mounted in a bracket unit 94 at the junction of the mast 32 with the boom 34, thus permitting the cable to extend longitudinally through the boom and, eventually, pass over a third guide pulley 96 rotatably mounted in a bracket unit 98 at the outer end of the boom, the free end of the cable being equipped with a conventional hook 100 for connection to the load 102 which is to be raised or lowered.

Finally, it is to be noted that transverse straps 104, 106, 108 are provided on the pulley brackets 90, 94 and 98, respectively, adjacent to but spaced from the peripheries of the respective pulleys 88, 92, 96, so as to prevent the cable 84 from becoming disengaged from those pulleys while traveling through the interior of the standard, mast and boom.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

In a hoist, the combination of a vertically extensible standard including a stationary hollow lower section and a hollow upper section slidably telescoped in the lower section, said sections being transversely polygonal to prevent relative rotation thereof, means for sliding the upper section relative to the lower section, a hollow upright mast rotatably mounted in the upper end portion of the upper section of said standard, a hollow boom extending laterally from the upper end of said mast, the lower end portion of said lower section being provided with a lateral opening, a guide pulley mounted in said opening, a second guide pulley provided in the junction of the mast and boom, a third guide pulley at the outer end of the boom, and a stationary winch provided adjacent the lower end of said standard and including a hoisting cable extending through said opening into the standard and passing around the first guide pulley, said cable extending upwardly through the standard and said mast to engage the second guide pulley and then passing outwardly through said boom over the third guide pulley for connection to a load, a bearing plate secured in a horizontal position intermediate the ends of said upper section and provided with an aperture to receive said hoisting cable, and a tubular sleeve secured to the upper surface of said plate, the lower end portion of said mast rotatably engaging said sleeve and resting on said plate.

CHARLES E. ALEXANDER.

References Cited in the file of this patent

UNITED STATES PATENTS

| Number | Name | Date |
|---|---|---|
| 63,037 | Green | Mar. 19, 1867 |
| 358,558 | Lathrop | Mar. 1, 1887 |
| 784,586 | McHahey | Mar. 14, 1905 |
| 797,942 | Covey | Aug. 22, 1905 |
| 1,345,304 | Zied | June 29, 1920 |
| 1,428,887 | Hescock | Sept. 12, 1922 |
| 1,509,800 | Vogel | Sept. 23, 1924 |
| 1,732,191 | Evans | Oct. 15, 1929 |